(12) United States Patent
Suzuki

(10) Patent No.: US 7,191,812 B2
(45) Date of Patent: Mar. 20, 2007

(54) PNEUMATIC TIRE

(75) Inventor: Kazuya Suzuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 81 days.

(21) Appl. No.: 10/502,603

(22) PCT Filed: Mar. 24, 2003

(86) PCT No.: PCT/JP03/03552

§ 371 (c)(1),
(2), (4) Date: Jul. 27, 2004

(87) PCT Pub. No.: WO03/082611

PCT Pub. Date: Oct. 9, 2003

(65) Prior Publication Data

US 2005/0252595 A1 Nov. 17, 2005

(30) Foreign Application Priority Data

Mar. 28, 2002 (JP) ............................... 2002-092008

(51) Int. Cl.
*B60C 15/00* (2006.01)
*B60C 15/06* (2006.01)

(52) U.S. Cl. ...................... 152/539; 152/542; 152/546; 152/552; 152/554

(58) Field of Classification Search ................ 152/539, 152/542, 555
See application file for complete search history.

(56) References Cited

U.S. PATENT DOCUMENTS 4,782,880 A * 11/1988 Staab .......................... 152/542

FOREIGN PATENT DOCUMENTS

| FR | 2237772 | * | 3/1975 |
| JP | 63-284006 A | | 11/1988 |
| JP | 2000-085319 A | | 3/2000 |
| WO | WO-00/05085 A1 | | 2/2000 |

\* cited by examiner

*Primary Examiner*—Justin R. Fischer
(74) *Attorney, Agent, or Firm*—Birch, Stewart, Kolasch & Birch, LLP

(57) ABSTRACT

A pneumatic tire, comprising a bead part (4) having a bead reinforcement layer (10) continuously extending from the inside part (10*a*) of a bead core (5) positioned on the axial inside of the tire to the outside part (10*c*) thereof on the axial outside of the tire through a bottom part (10*b*) passing the radial inside of the tire, the bead reinforcement layer (10) further comprising reinforcement cords (11) arranged at an angle of 20 to 60° relative to the circumferential direction of the tire, the outside part (10*c*) further comprising a main part (C1) extending to an area (Y) adjacent to a bead apex rubber (8) and a folded part (C2) folded up at the radial outer end (Ce) thereof, wherein the folded part (C2) terminates on the radial inside of the radial outer surface (5*s*) of the bead core (5).

5 Claims, 3 Drawing Sheets

PNEUMATIC TIRE

TECHNICAL FIELD

The present invention relates to a pneumatic tire which enhances steering stability by providing a bead reinforcing layer having a reinforcing cord between a bead core and a carcass ply.

BACKGROUND TECHNIQUE

In recent years, as output and performance of automobiles are enhanced, tires are also strongly required to enhance the steering stability together with riding comfort.

In a pneumatic tire, it is known that the steering stability can be enhanced by increasing the tire lateral rigidity. Therefore, a reinforcing layer using steel cord or organic fiber cord is conventionally provided over a wide range from a bead portion to a sidewall portion to enhance the flexural rigidity of the sidewall.

However, if such a reinforcing layer is used, the tire vertical rigidity is increased and thus, the riding comfort is deteriorated. Further, stress is prone to be concentrated on an outer end of the reinforcing layer. Especially when the reinforcing layer is used for a high performance tire in which a tire aspect ratio is reduced to 55% or lower and a ground-contact width and a ground-contact area are increased, a flexible region of the sidewall portion becomes narrow and stress is concentrated more. Thus, there is a tendency that the endurance is deteriorated.

Thereupon, the present inventor focused attention on a fact that not only the tire lateral rigidity but also twisting rigidity of the bead portion largely affected the steering stability, and researched. As a result, the inventor found that the tire vertical rigidity could be maintained at low level and the steering stability could be enhanced without deteriorating the riding comfort if a reinforcing layer in which reinforcing cords were arranged at a predetermined angle and which had a folded-back portion was formed around the bead core without projecting the reinforcing layer from a bead apex rubber, and the bead core and the bead apex rubber were formed integral with each other, and the twisting rigidity of the bead portion was enhanced.

The steering stability can be enhanced also by increasing the width of the bead core to increase the twisting rigidity and to enhance the fitting performance between the bead core and a rim. In such a case, however, since the steel amount of the bead core and a rubber amount of the bead apex rubber are increased, there is a problem that the tire weight is increased and the fuel performance is deteriorated.

Based on an idea that a predetermined reinforcing layer is provided around a bead core, it is an object of the present invention to provide a pneumatic tire capable of enhancing the steering stability without deteriorating the riding comfort and without excessively increasing the tire weight.

SUMMARY OF THE INVENTION

To achieve the object, the present invention provides a pneumatic tire, comprising a carcass including a carcass ply having a ply body portion which extends from a tread portion to a bead core of a bead portion through a sidewall portion and which is continuously provided with a ply folded-up portion folded up around the bead core from its inner side to its outer side in the tire axial direction, and a bead apex rubber passing between the ply body portion and the ply folded-up portion and extending radially outward of the tire from a radially outer surface of the bead core, wherein the bead portion is provided with a bead reinforcing layer which is arranged from an inner portion of the bead core located inward in the tire axial direction through a bottom portion passing radially inward and which is connected to an outer portion of the bead core outward in the tire axial direction and which is arranged at an angle of 20 to 60° with respect to a tire circumferential direction, the outer portion includes a main portion which extends radially outward of the tire beyond the radially outer surface of the bead core to a region adjacent to the bead apex rubber, and a folded-back portion which is folded back at a radially outer end and terminated radially inward of the radially outer surface of the bead core, the inner portion passes between the bead core and the ply body portion, and the outer portion passes between the bead core and the ply folded-up portion.

It is preferable that a width H1 of the folded-back portion of the bead reinforcing layer in the radial direction is 5 to 40 mm. It is preferable that a radial height H2 of the outer portion of the bead reinforcing layer from a bead base line is 1.5 to 4.5 times a radial height H3 of the bead apex rubber, and is smaller than a radial height H4 of the bead apex rubber. It is preferable that a radial height H5 of the ply folded-up portion of the carcass ply is greater than the height H4 of the bead apex rubber.

In this specification, the term "bead base line" means a line in the tire axial direction passing through a bead diameter position defined in a standard on which tires are based.

DETAILED DESCRIPTION OF THE INVENTION

An example of the present invention will be explained with reference to the drawings. In this example, the pneumatic tire of the invention is a high performance passenger automobile tire having a tire aspect ratio of 55% or lower.

Figure 1:
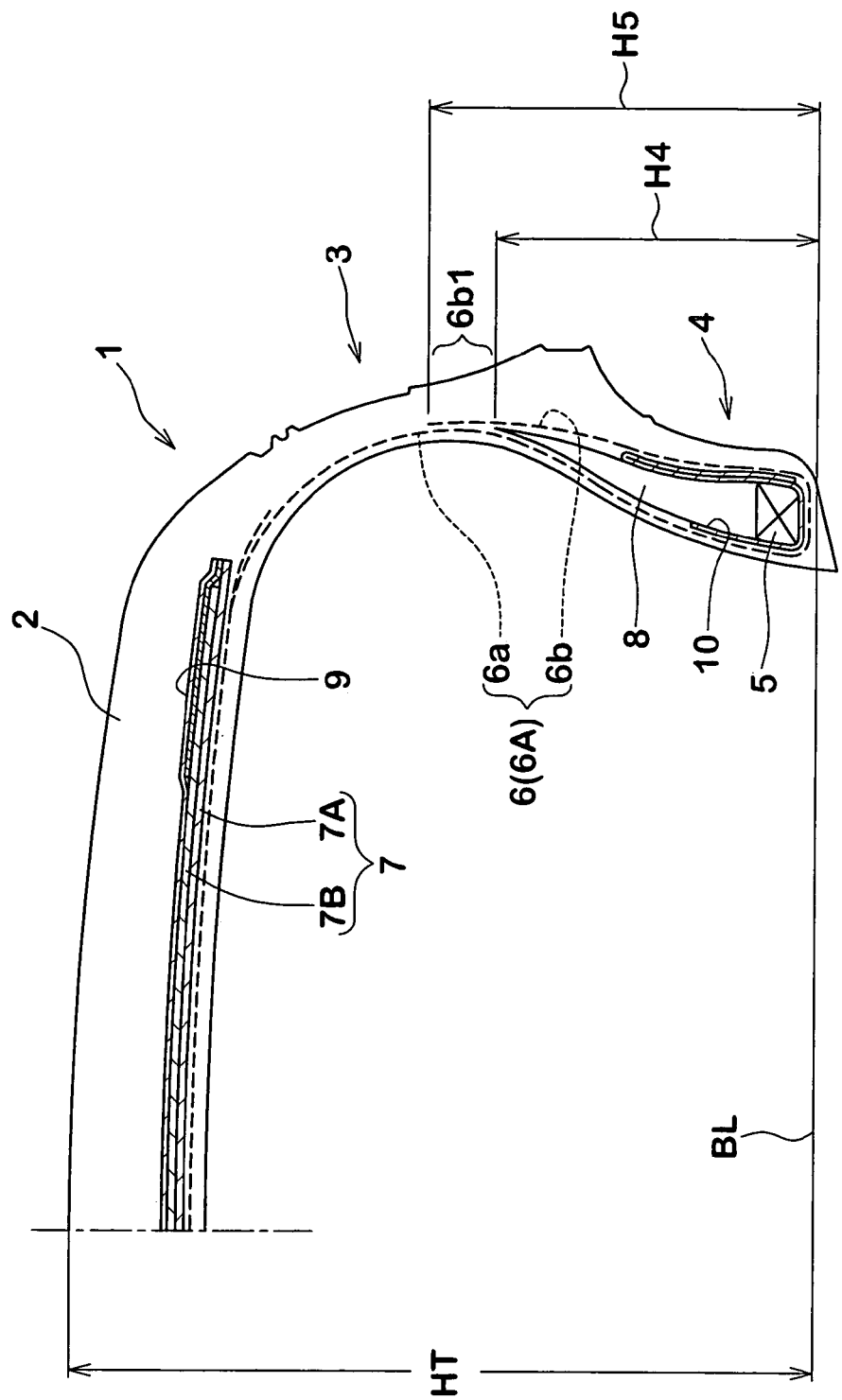
FIG. 1 is a sectional view of a tire according to an embodiment of the present invention.

As shown in FIG. 1, the pneumatic tire 1 includes a carcass 6 extending from a tread portion 2 to a bead core 5 of a bead portion 4 through a sidewall portion 3, and a belt layer 7 disposed on the inner side of the tread portion 2 and on the outer side of the carcass 6. The bead portion 4 is provided with a bead apex rubber 8 extending from a radially-outer surface of the tire of the bead core 5 to radially outward of the tire.

The belt layer 7 comprises two or more, in this example, two belt plies 7A and 7B in which high elastic belt cords are arranged in a tire circumferential direction at an angle of 10 to 35° for example. Inclination directions of the belt plies 7A and 7B are changed such that the belt cords intersect with each other between the plies. With this configuration, the belt rigidity is enhanced, and substantially the entire width of the tread portion 2 is strongly reinforced with a hoop effect. A steel cord or an organic fiber cord having high modulus such as aromatic polyamide fiber is preferably used as the belt cord.

In this example, in order to enhance a binding force with respect to the belt layer 7 and to enhance the high speed endurance, a band layer 9 is disposed on an outer side of the belt layer 7. The band layer 9 includes a band cord which is helically wound in the tire circumferential direction at an angle of 5° or less for example. The band layer 9 extends such as to wrap at least an outer end of the belt layer 7 in the tire axial direction.

The carcass 6 comprises one or more, in this example, one carcass ply 6A in which a carcass cord is arranged at an angle of 75 to 90° with respect to the tire circumferential direction. The carcass ply 6A is integrally provided with a ply body portion 6a extending between the bead cores 5 and 5, and with a ply folded-up portion 6b which is folded up around the bead core 5 from the inner side to the outer side in the tire axial direction on both ends of the ply body portion 6a. An organic fiber cord such as nylon, rayon, polyester, and aromatic polyamide can preferably be used as the carcass cord.

Next, the bead apex rubber 8 passes between the ply body portion 6a and the ply folded-up portion 6b of the carcass 6, and has a triangular cross section which is tapered radially outward of the tire.

In this example, in order to secure the tire rigidity required for the high performance tire, a radial height H4 of the bead apex rubber 8 from the bead base line BL is set in a range of 0.25 to 0.5 times a height HT of a tire cross section. A radial height H5 of the ply folded-up portion 6b from the bead base line BL is set greater than the height H4, thereby forming an extending portion 6b1 extending beyond the bead apex rubber 8. The extending portion 6b1 and the ply body portion 6a are adjacent to each other. With this configuration, the bead apex rubber 8 is completely covered and the tire rigidity is further enhanced.

In this invention, in order to further enhance the steering stability, the bead portion 4 is provided with a bead reinforcing layer 10.

Figure 2:
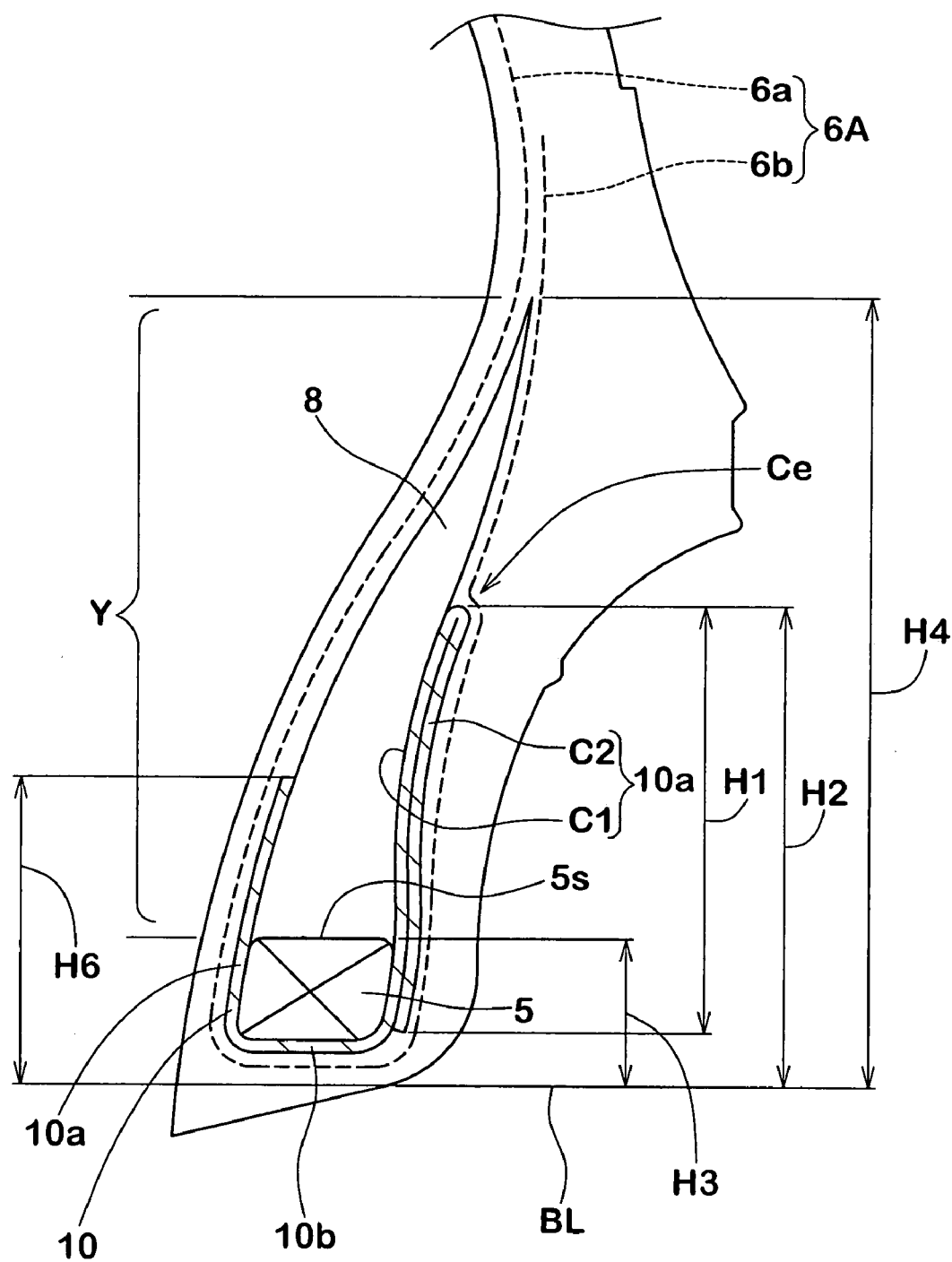
FIG. 2 is an enlarged sectional view of a bead portion together with a reinforcing layer.
Figure 3:
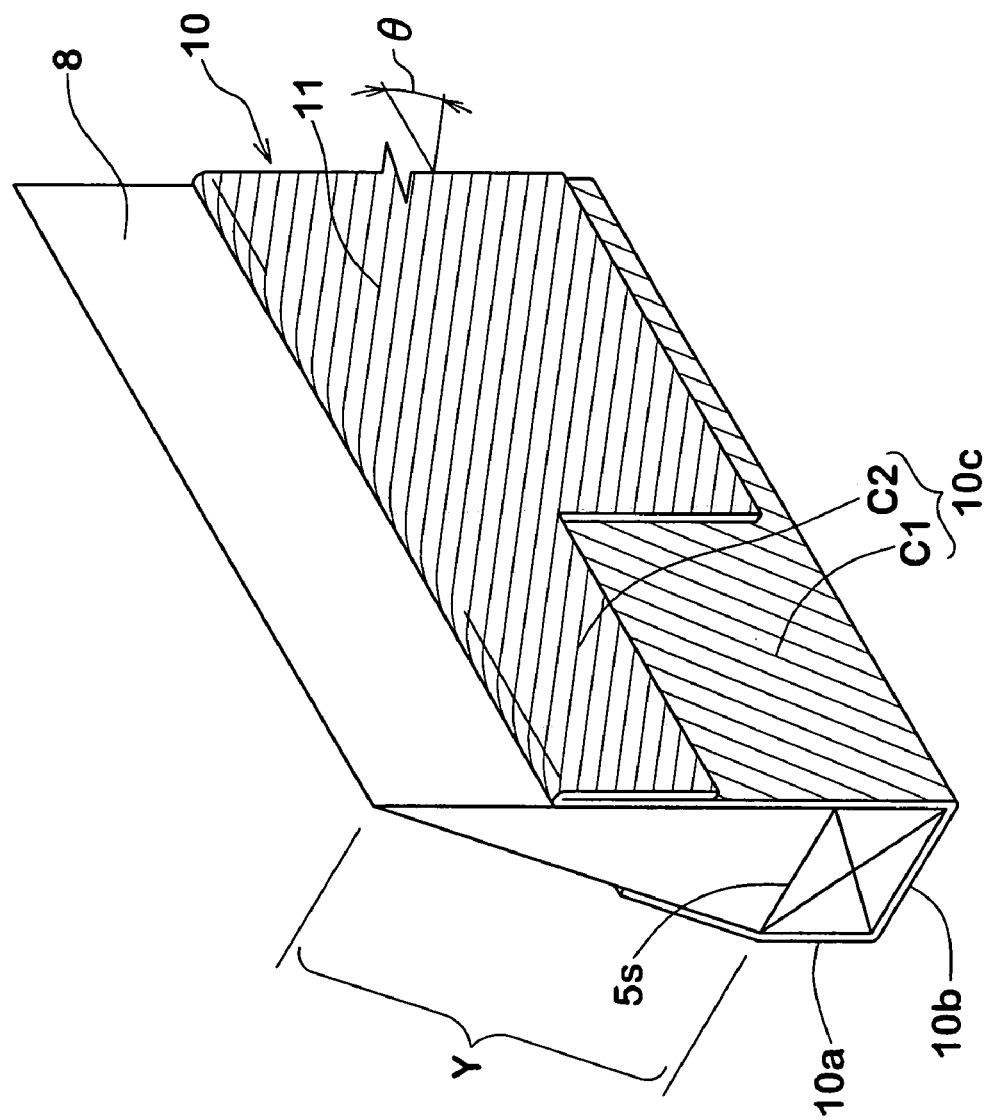
FIG. 3 is a perspective view showing the reinforcing layer together with a bead core and a bead apex rubber.

As shown in FIGS. 2 and 3, the bead reinforcing layer 10 comprises one cord ply in which reinforcing cords 11 are arranged at an angle θ (20 to 60°) with respect to the tire circumferential direction. Organic fiber cord such as nylon, polyester, rayon, and aromatic polyamide can be used as the reinforcing cord 11. Nylon cord is especially preferable because the thickness of the cord can be increased by folding the same.

The bead reinforcing layer 10 comprises an inner portion 10a located on the inner side of the bead core 5 in the tire axial direction, a bottom portion 10b passing radially inward of the bead core 5, and an outer portion 10c located on the outer side of the bead core 5 in the tire axial direction. These portions 10a, 10b and 10c are continuously connected to one another to form the U-shape.

The inner portion 10a passes between the bead core 5 and the ply body portion 6, and the outer portion 10c passes between the bead core 5 and the ply folded-up portion 6b. At least the outer portion 10c, in this example, both the outer portion 10c and the inner portion 10a extend beyond the radially outer surface 5s of the bead core 5, radially outward, and extends to a region Y which is adjacent to the bead apex rubber 8.

Thus, the bead reinforcing layer 10 brings the bead core 5 and the bead apex rubber 8 into tight contact with each other to wrap them in the U-shape and integrally and strongly couples the bead core 5 and the bead apex rubber 8 to each other.

The outer portion 10c includes a main portion C1 which is connected to the bottom portion 10b and extends to the region Y which is adjacent to the bead apex rubber 8, and a folded-back portion C2 which is folded back at a radial outer end Ce of the main portion C1 and superposed on the main portion C1 and extends radially inward. The folded-back portion C2 is terminated radially inward of the radially outer surface 5s of the bead core 5.

A cord angle θ of the bead reinforcing layer 10 is in a range of 20 to 60°. Thus, the reinforcing cords 11 intersect with each other at an angle of 2×θ to form a strong intersecting structure between the main portion C1 and the folded-back portion C2. With this structure, and with effect of the integral structure between the bead core 5 and the bead apex rubber 8, the twisting rigidity of the bead portion 4 can be effectively enhanced, and the steering stability can be enhanced.

In the bead reinforcing layer 10, since radial heights H6 and H2 of the inner portion 10a and the outer portion 10c from the bead base line BL are smaller than the radial height H4 of the bead apex rubber 8, the tire's vertical rigidity is restrained from being increased, and the deterioration of the riding comfort is suppressed.

In order to enhance the steering stability, it is preferable that a width H1 of the folded-back portion C2 in the radial direction is in a range of 5 to 40 mm. If the width H1 is less than 5 mm, the twisting rigidity is insufficient, and if the width H1 exceeds 40 mm, the riding comfort is deteriorated.

For the same reason, it is preferable that the radial height H2 of the outer portion 10c is 1.5 to 4.5 times the radial height H3 of the bead core 5. If the height H2 is less than 1.5 times, the twisting rigidity is insufficient, and if the height H2 exceeds 4.5 times, the riding comfort is deteriorated.

Since the outer portion 10c of the bead reinforcing layer 10 is lower than the bead apex rubber 8, the stress concentration on the outer end Ce can be reduced. Since the ply folded-up portion 6b covers the outer end Ce, bead damage such as cord loose can be suppressed.

Since the bead reinforcing layer 10 is formed with the folded-back portion C2, the bead core 5 is displaced axially inward by a distance corresponding to the thickness of the folded-back portion C2. As a result, the fitting performance with respect to the rim is enhanced, and this configuration also enhances the steering stability.

Although the preferred example of the present invention has been described in detail, the invention is not limited to the illustrated example, and the various changes and modifications may be made in the invention.

EMBODIMENT

Tires of 215/45ZR17 size were prototyped based on the specifications shown in Table 1. The steering stability, riding comfort and weight of the prototyped tire were measured and compared with each other. Specifications not shown in Table 1 are substantially the same. The test method is as follows:

(1) Steering Stability

The tires were mounted on all rims (17×7JJ) of a passenger vehicle (Japanese FR vehicle, displacement of 2500 cc) under internal pressure of 200 kPa, and the vehicle was run on a dry asphalt road at a speed of 120 km/H. The straight running stability and lane change stability at that time were evaluated by a driver's sensory evaluation on a scale of 10 while a comparative example was defined as 5. A greater value indicates more excellent result.

(2) Riding Comfort

The same test vehicle was run on an asphalt road (good road), and the riding comfort was evaluated by a driver's sensory evaluation on a scale of 10 while a comparative example was defined as 5. A greater value indicates more excellent result.

(3) Tire Weight

The weight of one tire was measured.

TABLE 1

|  | Comparative example 1 | Comparative example 2 | Embodiment 1 | Embodiment 2 | Embodiment 3 | Embodiment 4 | Embodiment 5 |
|---|---|---|---|---|---|---|---|
| Bead reinforcing layer | Absence | Presence | Presence | Presence | Presence | Presence | Presence |
| Reinforcing cord | — | Nylon | Nylon | Nylon | Nylon | Nylon | Nylon |
| Cord angle θ (°) | — | 50 | 50 | 50 | 50 | 20 | 60 |
| Presence or Absence of folded-back portion | — | Absence | Presence | Presence | Presence | Presence | Presence |
| Heights (mm) |  |  |  |  |  |  |  |
| H1 | — | — | 10 | 20 | 30 | 20 | 20 |
| H2 | — | 35 | 35 | 35 | 35 | 35 | 35 |
| H3 | 6 | 6 | 6 | 6 | 6 | 6 | 6 |
| H4 | 45 | 45 | 45 | 45 | 45 | 45 | 45 |
| H5 | 60 | 60 | 60 | 60 | 60 | 60 | 60 |
| H6 | — | 15 | 15 | 15 | 15 | 15 | 15 |
| Bead core (*1) | 4S × 4T | 5S × 4T | 4S × 4T | 4S × 4T | 4S × 4T | 4S × 4T | 4S × 4T |
| Steering stability | 5.0 | 6.0 | 6.0 | 6.5 | 6.5 | 6.5 | 6.5 |
| Riding comfort | 7.0 | 6.5 | 6.5 | 6.5 | 6.0 | 6.0 | 5.5 |
| Tire weight (kg) | 9.8 | 10.3 | 10.1 | 10.1 | 10.1 | 10.1 | 10.1 |

(*1) This is a tape bead structure, and "nS × mT" means that n-number of bead wires are arranged in the widthwise direction and m-number of bead wires are arranged in the height direction.

INDUSTRIAL APPLICABILITY

Since the pneumatic tire of the invention is provided with a bead reinforcing layer having a predetermined structure around the bead core. Therefore, it is possible to enhance the steering stability without deteriorating the riding comfort and without excessively increasing the tire weight.

The invention claimed is:

1. A pneumatic tire, comprising a carcass including a carcass ply having a ply body portion which extends from a tread portion to a bead core of a bead portion through a sidewall portion and which is continuously provided with a ply folded-up portion folded up around the bead core from its inner side to its outer side in the tire axial direction, and a bead apex rubber passing between the ply body portion and the ply folded-up portion and extending radially outward of the tire from a radially outer surface of the bead core, wherein the bead core has radially inner and outer surfaces, and axially inner and outer surfaces, the bead portion is provided with a bead reinforcing layer having an inner portion, a bottom portion and an outer portion wherein the inner portion extends along the axially inner surface of the bead core, the bottom portion extends along the radially inner surface of the bead core, and the outer portion extends along the axially outer surfaces of the bead core, and the bead reinforcing layer has reinforcing cords arranged therein at an angle of 20 to 60° with respect to a tire circumferential direction, the outer portion of the bead reinforcing layer includes a main portion which extends radially outward of the tire beyond the radially outer surface of the bead core to a region adjacent to the bead apex rubber, and a folded-back portion which is folded back at a radially outer end thereof and terminates radially inward of the radially outer surface of the bead core, the inner portion of the bead reinforcing layer passes between the bead core and the ply body portion, and the outer portion passes between the bead core and the ply folded-up portion, and the ply folded-up portion of the carcass ply has a radial height larger than the radial height of the bead apex rubber, and the end portion thereof, extends radially outward of the tire beyond the bead apex rubber to be adjacent to the ply body portion of the carcass ply so as to wrap around the bead apex rubber.

2. The pneumatic tire according to claim 1, wherein the height of the folded-back portion of the bead reinforcing layer in the radial direction is 5 to 40 mm.

3. The pneumatic tire according to claim 1 or 2, wherein a radial height of the outer portion of the bead reinforcing layer from a bead base line is 1.5 to 4.5 times a radial height of the bead core, and is smaller than a radial height of the bead apex rubber.

4. The pneumatic tire according to claim 1 or 2, wherein the radial height of the inner portion of the bead reinforcing layer is less than the radial height of the outer portion of the bead reinforcing layer.

5. The pneumatic tire of claim 1 wherein the radial height of the inner and outer portions of the bead reinforcing layer from a bead base line are less than the radial height of the bead apex rubber.

* * * * *